United States Patent [19]
Kerry, Sr.

[11] Patent Number: 5,577,328
[45] Date of Patent: Nov. 26, 1996

[54] ELECTRICAL CONDUIT ENTRY TEMPLATE

[76] Inventor: James E. Kerry, Sr., 1536 Ballard, St. Louis, Mo. 63137

[21] Appl. No.: 422,071

[22] Filed: Apr. 13, 1995

[51] Int. Cl.⁶ ........................................ G01B 3/00
[52] U.S. Cl. ............................... 33/563; 33/1 G
[58] Field of Search ............... 33/563, 565, DIG. 10, 33/1 B, 566, 1 G

[56] References Cited

U.S. PATENT DOCUMENTS

| | | |
|---|---|---|
| D. 142,608 | 10/1945 | Ziegfeld . |
| D. 165,849 | 2/1952 | Jordan . |
| D. 167,043 | 6/1952 | Kintz ........................... 33/563 |
| D. 347,586 | 6/1994 | Kim . |
| 1,587,133 | 6/1926 | Anhof ........................... 33/1 B |
| 1,604,323 | 10/1926 | Lipke ........................... 33/565 |
| 2,049,245 | 7/1936 | Breitbarth ..................... 33/1 B |
| 2,478,071 | 8/1949 | Agrillo ......................... 33/565 |
| 2,500,873 | 3/1950 | Sager ........................... 33/563 |
| 2,797,493 | 7/1957 | Watson . |
| 3,037,293 | 6/1962 | Yost ............................. 33/565 |
| 3,376,650 | 4/1968 | Cook . |
| 3,500,550 | 3/1970 | Mihai . |
| 4,228,592 | 10/1980 | Badger . |
| 4,461,086 | 7/1984 | Segletes . |
| 4,584,780 | 4/1986 | Pressey . |
| 4,595,203 | 6/1986 | DeLano et al. . |
| 4,791,733 | 12/1988 | Pan et al. . |
| 4,793,069 | 12/1988 | McDowell . |
| 4,837,939 | 6/1989 | Pullen . |
| 4,936,020 | 6/1990 | Neblett . |
| 5,383,281 | 1/1995 | Monger ......................... 33/520 |
| 5,390,418 | 2/1995 | Buono et al. ................... 33/565 |

FOREIGN PATENT DOCUMENTS

| | | | |
|---|---|---|---|
| 1190810 | 10/1959 | France ........................... 33/1 B |
| 125743 | 5/1959 | U.S.S.R. ......................... 33/1 B |
| 432589 | 7/1935 | United Kingdom .............. 33/563 |

*Primary Examiner*—Thomas B. Will
*Attorney, Agent, or Firm*—Kalish & Gilster

[57] ABSTRACT

A template for facilitating marking of entry holes in a surface for passage therethrough of conduit has a flat portion formed of semi-rigid material and two flat sides. The flat portion has a central opening and a plurality of markings on one side. The markings are parallel to a section of the perimeter and spaced inwardly at graduated distances therefrom. A plurality of slots are formed through the flat portion, spaced apart and parallel to one another, substantially coextensively with each corresponding one of the plurality of markings, to thereby permit a user of the template to make a mark through one of the slots to indicate an outer edge of a hole of a preselected size to be formed using the template.

20 Claims, 6 Drawing Sheets

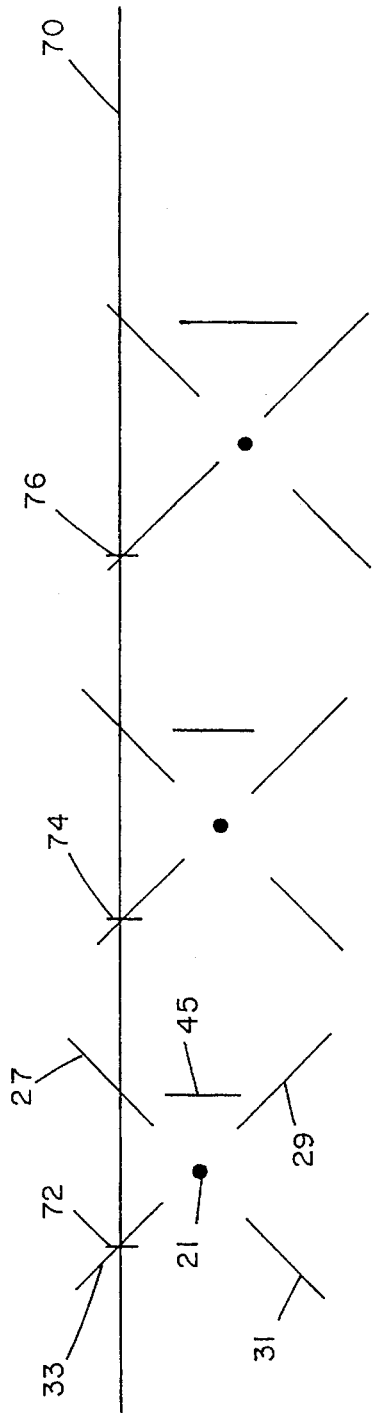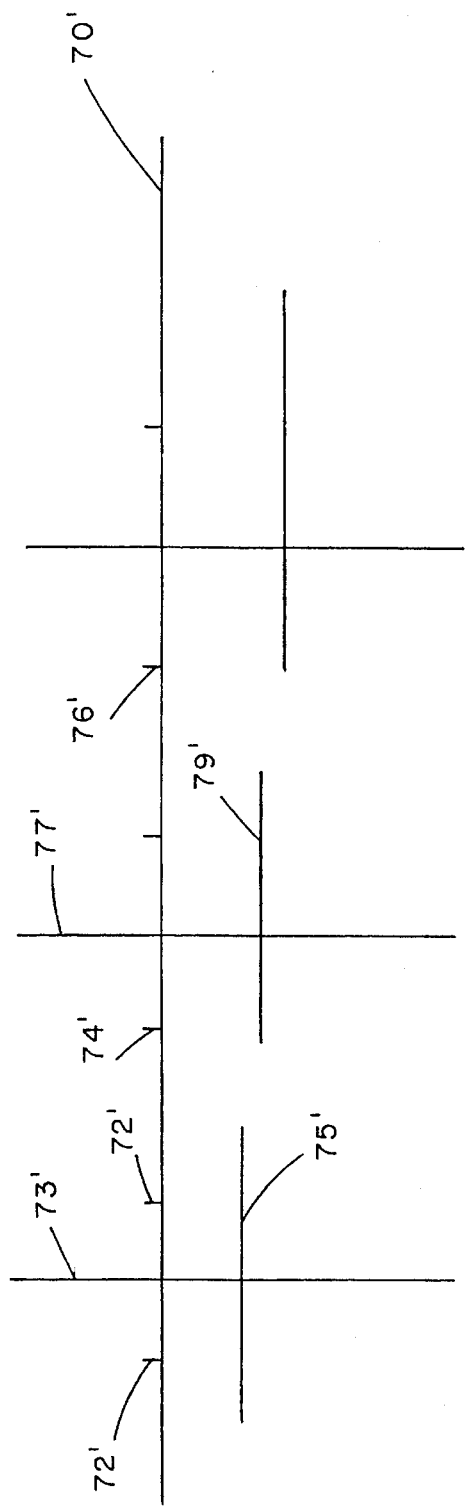
FIG. 8
FIG. 9 (PRIOR ART)

ELECTRICAL CONDUIT ENTRY TEMPLATE

BACKGROUND AND SUMMARY OF THE INVENTION

The present invention relates generally to the field of stencils for use in the construction industry and, more specifically, to a template for marking entry holes for conduit, such as the type used by electricians for carrying electrical wires.

It is often necessary in the construction industry for electric wires to be carried within conduit, such as metal or plastic piping, for example, which may be of any of a wide variety of sizes and which is generally referred to in the trade by the size of the interior diameter of the pipe, in inches; i.e., the "trade size". The particular trade sizes commonly used have been standard in the industry in the United States and Canada for many years.

It is well known that in order for electricians to properly install such conduit they must frequently drill holes, commonly referred to as "entry" holes for receipt of the conduit, such as for entry of the conduit and wires therein into a panel forming one end of a wiring box, or through some other surface such as a wall or floor. Because the pipes (conduits) are referred to in the trade by inside diameter, which may include fractions of an inch, and because the hole which receives a given pipe must be large enough to accommodate the added dimension of the pipe's wall; i.e., adding another fraction of an inch, accurate and neat formation of the proper size(s) and number of pipe entry holes can become complex and extremely time consuming. This is particularly the case if a large number and variety of sizes of pipes are required, and especially if coaxial holes of the same size are also required, for example to permit exit through another, parallel, surface of at least some of the same conduits which entered the box.

Previously, this procedure was managed merely with the use of a pencil, a square and a standard ruler, laboriously and painstakingly measuring off each hole, taking into account the distance of the outside edge of the pipe from the edge of the surface through which a hole was to be made, the distance from the outside of the next closest pipe, the inside diameter of each pipe and the thickness of the pipe wall, as will be described in further detail later. If multiple rows and columns of pipes and/or various sizes thereof are necessary conduit entry hole formation becomes an extremely time consuming and tedious task due to the above-mentioned measurements and mathematical calculations. Furthermore, errors often occur as a result of the traditional method of hole marking, which errors result in duplication of effort as well as wasted material.

The template (or stencil) of the present invention, which may consist of one or two parts, is designed so as to greatly simplify and therefore speed up the above process with only the use of a pencil and the new stencil, which may be used in one or two parts depending upon the size of the hole to be made. Very little training is necessary for one to become familiar with the use of the new stencil for precise, accurate entry hole marking. Indeed for experienced carpenters or electricians familiar with the conventional procedure for forming conduit entry holes the new device is essentially self-explanatory and can become very rapid to use with just a little practice.

The present conduit entry template is formed with a smaller, central portion, for convenient use alone in marking entry holes for conduit of the most common sizes, and a larger exterior portion, into which the smaller portion fits fairly snugly and coaxially for use in marking entry holes for larger conduits. Thus, the central opening of the smaller template portion is used alone for marking the conduit hole center, whether the hole to be marked is small enough to mark with only the inner template portion, or so large as to require the addition of the larger, outer stencil portion.

The new stencil also is designed to take into account the differences in interior and exterior diameters of standard electrical conduit and thereby reduce marking errors which can readily occur due to miscalculation and/or confusion between the interior and exterior diameters of the pipe to be installed. The template of the present invention is provided with premeasured markings and numerals associated with those markings to indicate to the user the interior diameter of the conduit hole being marked. Openings formed through the template along the premeasured marks permit pencil marking of the hole edge for a hole sized appropriately for a conduit having an interior diameter (trade size) as selected and which automatically compensates for the additional distance needed to accommodate the standard thickness of the pipe wall.

A ruler marked in eighths of an inch is provided on at least one edge of each of the inner (interior) and outer (exterior) stencil portions so that a separate tool is not required to measure distances between adjacent hole edges and between the hole edges and a wall or panel edge.

The new stencil is also adapted to provide "cross hair" marks to guide use of a knockout hole cutter and to facilitate exact spacing between holes, regardless of diameter differences, and uniform spacing from a point on each hole edge to (for example) a panel edge which will be adjacent to a wall upon which the electrical box being marked is to be mounted.

Accordingly, it is among the goals of the present invention to provide a stencil for facilitating fast and accurate marking of the entry holes to be formed in a surface for passage therethrough of conduit of substantially any preselected size or sizes, for example, those in the range of from approximately one half to at least about 4 inches internal diameter (i.d.).

It is also among the goals of the present invention, having the above features, that use of the new template will result in accurate, neat hole markings, faster than previously possible, by allowing the user to reduce the number of measurements which must be made individually for every hole to be formed by the conventional conduit entry hole marking method.

It is further among the goals of the present invention, having the features indicated, that it be equally useful by people who are left-handed, as well as by those who are right-handed, and that the device be simple to use, without the aid of other tools, even by people with little or no training.

It is also among the goals of the new conduit entry hole template that it be suitable for manufacture with materials which are inexpensive and readily available and by facile and economical methods which are already known, as well as possibly by new methods, yet to be developed, and with the use of new materials, as yet unknown.

Accordingly, in keeping with the above goals and advantages, the present invention is, briefly, a template for facilitating marking of entry holes in a surface for passage therethrough of conduit. The template has a flat portion formed of semi-rigid material and two flat sides. The flat portion has a central opening and a plurality of markings on one side. The markings are parallel to a section of the perimeter and spaced inwardly at graduated distances therefrom. A plurality of slots are formed through the flat portion, spaced apart and parallel to one another, substantially coextensively with each corresponding one of the plurality of markings, to thereby permit a user of the template to make a mark through one of the slots to indicate an outer edge of a hole of a preselected size to be formed using the template.

Moreover, the invention is also, briefly, a method for marking entry holes to be formed in a surface for passage through the holes of conduit, the method includes applying the above template to the surface to be marked, marking an elongated straight line on the surface to be marked at a preselected distance from an edge of the surface to be marked, making a transverse mark at one end of the straight line to thereby indicate the outermost edge of a hole to be formed in the surface, marking through the central opening of the flat portion the center of the hole to be formed, and marking the edge of the hole to be formed by making a mark through a preselected one of the plurality of slots formed through the at least one flat portion.

The new method further includes, briefly, using a template such as above and which has four straight slots extending radially outwardly and spacedly from the central opening of the template, each slot being at 90° from each adjacent slot, and extending outwardly toward the perimeter of the flat portion. And, making a mark on the surface thereof each one of the four straight slots extending radially outwardly from the central opening of the template.

Further advantages of the invention will be in part apparent and in part pointed out hereinbelow.

BRIEF DESCRIPTION OF THE DRAWINGS

FIG. 8 is a schematic illustration of an example of the marks resulting from use of the template of FIG. 1 for making a series of entry holes of various sizes along a line such as that shown in FIG. 7A.

FIG. 9 is a schematic illustration of an example of the marks resulting from preparation of a surface by the conventional method for drilling of conduit entry holes.

Throughout the drawings like element numbers will be used to indicate like parts.

DESCRIPTION OF THE PREFERRED EMBODIMENT

Figure 1:
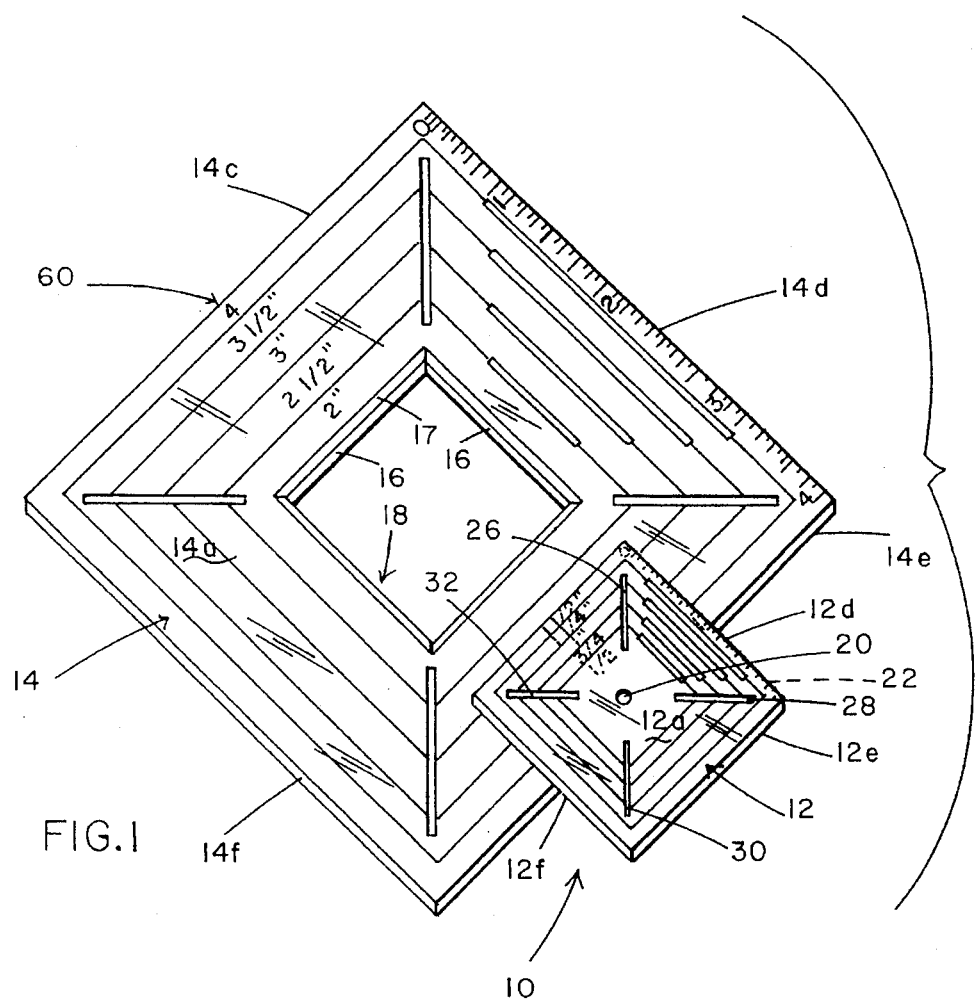
FIG. 1 is an exploded perspective view of two portions of an electrical conduit entry template constructed in accordance with and embodying the present invention.

With reference to the drawings, 10 generally designates an electrical conduit entry template constructed in accordance with and embodying the present invention. Template (or stencil) 10 preferably consists of two flat, square pieces 12, 14, which when fitted together are coaxial, and each have two opposed, front and back, substantially flat sides, 12a, 12b and 14a, 14b, respectively. The two pieces 12, 14 when used together permit marking of entry holes up to at least about 4½" in diameter. However, it is to be understood that template 10 can consist only of portion 12, which is used alone to mark entry holes for conduit having an internal diameter of up to about one and one-half inches.

Portions 12, 14 are both preferably injection molded from clear polystyrene resin, acrylic, or other suitable plastic or similarly sufficiently flexible, semi-rigid substances, which may be either colorless, or provided with a tint, for example to reduce the chance of misplacing template 10, or merely for aesthetic preferences. Template 10 is desirably formed to a thickness, from one flat side to the other, of approximately $\frac{1}{16}$th inch. Although a thicker or thinner template 10 can certainly suffice, the preferred thickness is optimal for durability, economy and workability.

For optimum ease of use, template 10 is substantially entirely transparent. However, semi-transparent, and even opaque materials can be used, although not as conveniently. Each template portion 12, 14 is provided with measuring indicia which are preferably formed as raised parts of the corresponding portion. As such, they are formed of the same ordinarily transparent substance as the template. Optionally, however, all letters, numbers or other markings on template 10 can be made, for example, in ink or paint, at a level which is flush with the front flat side surfaces 12a, 14a of the corresponding template portion.

The respective areas of the flat sides of portions 12, 14 are each defined by a perimeter preferably formed by four edges of correspondingly equal length, 12c, 12d, 12e, 12f, all being the same, and 14c, 14d, 14e, 14f, all being the same, respectively. When viewed from the perspective of a user holding stencil 10 and facing it, as in the position shown in FIG. 2, edges 12c, 14c are at the top, edges 12d, 14d are to the right, edges 12e, 14e are at the bottom and edges 12f, 14f are positioned to the left of the user.

Although it is conceivable that template 10 could have a perimeter defining some shape other than a square, certainly the preferred shape is most convenient to use, as will become clear hereafter. For example, the perimeter of the portions of the new template could be round and the appropriate lines thereon, to be described hereafter, could still be provided on the surface.

Figure 2:
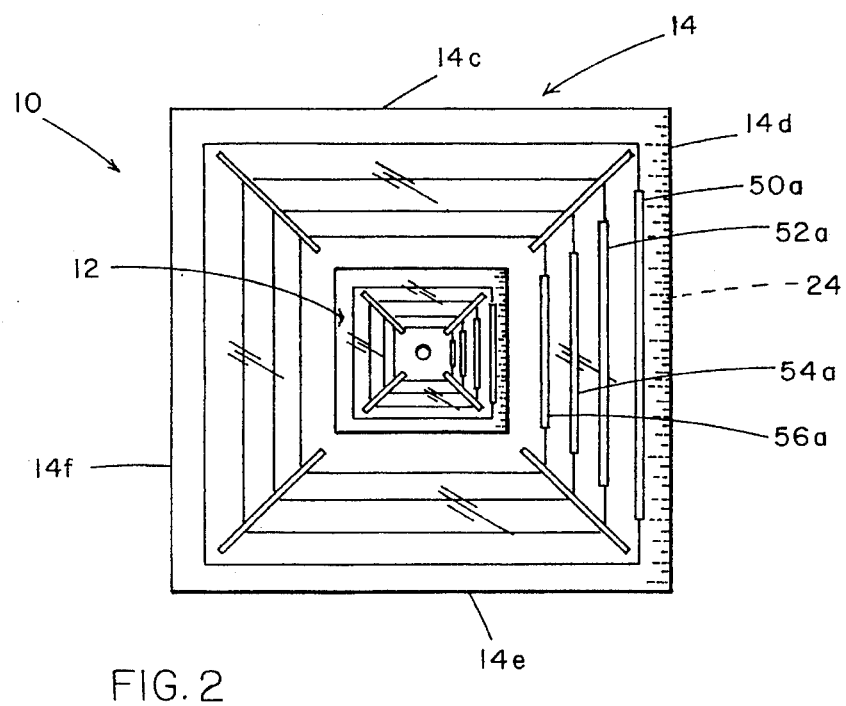
FIG. 2 is a top plan view of the template portions of FIG. 1 assembled for use as a single unit, numerals omitted for simplicity.
Figure 3:
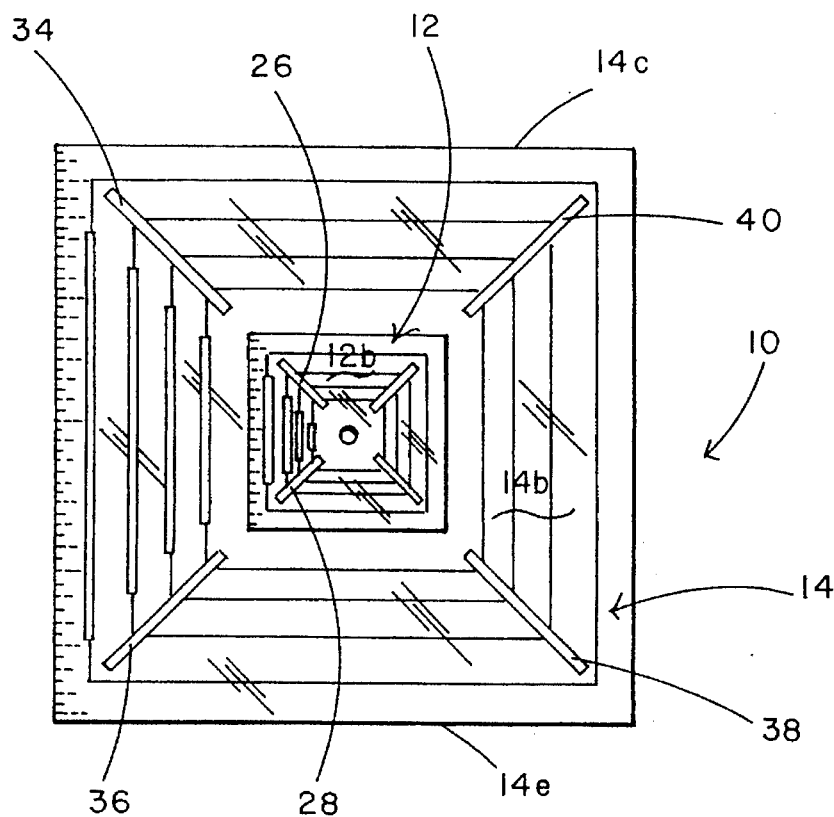
FIG. 3 is a bottom plan view of the template shown in FIG. 2.
Figure 4:
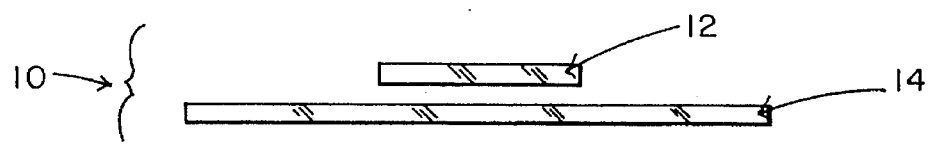
FIG. 4 is an edge view of the two portions of template of FIG. 2, exploded for clarity.

As seen in FIGS. 1 and 2, the smaller portion 12 of template 10 is sized to fit within the larger, outer portion 14, so that the edges of inner portion 12 rest against a narrow shoulder 16 optionally formed entirely around the perimeter or edge 17 of a square, central opening 18 formed in outer portion 14, preferably entirely through, from one flat side 14a, 14b to the other. Alternatively, for economy of manufacture, central opening 18 in outer portion 14 may be formed without shoulder 16 to stop central portion 12 from passing through the opening. In that case, smaller, inner portion 12 will just fit within opening 18, and is capable of slipping through without a substantial amount of force. However, in this case, the combined use of portions 12, 14 is still quite facile because the back flat surfaces 12b, 14b are both supported against the flat surface to be marked with template 10.

Inner portion 12 also has a central opening 20 formed entirely through from side 12a to side 12b. However, opening 20 is a small aperture, approximately 1/8th inch in diameter, and in any case, large enough only to allow operational passage therethrough of the point of a pencil or other similar marking instrument, for accurately marking as will be described, the center of a conduit entry hole to be formed in a flat surface against which the rear side(s) 12b, 14b of template 10 are positioned.

A ruler 22, 24 is desirably marked at least along one edge of each corresponding template portion 12, 14, preferably along edge 12d, 14d, respectively. As shown most clearly in FIG. 5, ruler 22 is approximately one and seven eighths inches long, and as shown in FIG. 6, ruler 24 is about four and one-half inches long, in the preferred embodiment. Each ruler 22, 24 is desirably marked in measurements at least as fine as one eighth of an inch. Of course, if template 10 is made to something other than the preferred size, or provided with metric measurements, the rulers will necessarily be altered accordingly.

As seen, for example, in FIGS. 1, 2, 3 and 5, straight, elongated slots 26, 28, 30, 32 are formed entirely through portion 12, from front to back to permit marking of lines therethrough with a pencil or other instrument. The marks formed in this manner are commonly referred to as cross hairs and provide a means for sighting a tool for accurate cutting of the conduit hole to be formed at the marked spot. Slots or grooves 26, 28, 30, 32 preferably extend at forty-five° angles between the longitudinal and horizontal axes of portion 12 and extend along a substantial portion of the distance from center hole 20, outwardly toward the corresponding corner formed at the intersection of each pair of adjacent edges 12c, 12d, 12e, 12f. Any of slots 26, 28, 30, 32 which are adjacent to each other are thus 90° apart.

Similarly, elongated slots 34, 36, 38, 40 extend along straight lines at 45° between the central vertical and horizontal axes of template portion 14, outwardly toward the corners formed by intersections of each adjoining pair of edges 14c, 14d, 14e, 14f. All of the angled slots in both portions 12, 14 are preferably about 0.064 in. wide, or at least sufficiently large to permit marking therethrough with a pencil, pen, etc., as will be described further hereafter.

Although minor variations in the new template dimensions (to be discussed) are acceptable, the slots must be sized and positioned so as to permit accurate marking of the cross hair lines for placement of a knockout punch (or "cutter") for cutting the conduit hole. For ease of manufacture and use, as well as for aesthetic reasons, the illustrated positions of these angled slots are preferred.

In each portion 12, 14, preferably inwardly from side edges 12d, 14d there are formed a plurality of straight, parallel, spaced-apart slots which serve as openings through which to mark the edge of a conduit hole of the correct size for entry of a conduit having a trade size (interior diameter) corresponding to the size which is marked beneath a line which passes through the corresponding slot longitudinally.

Figure 5:
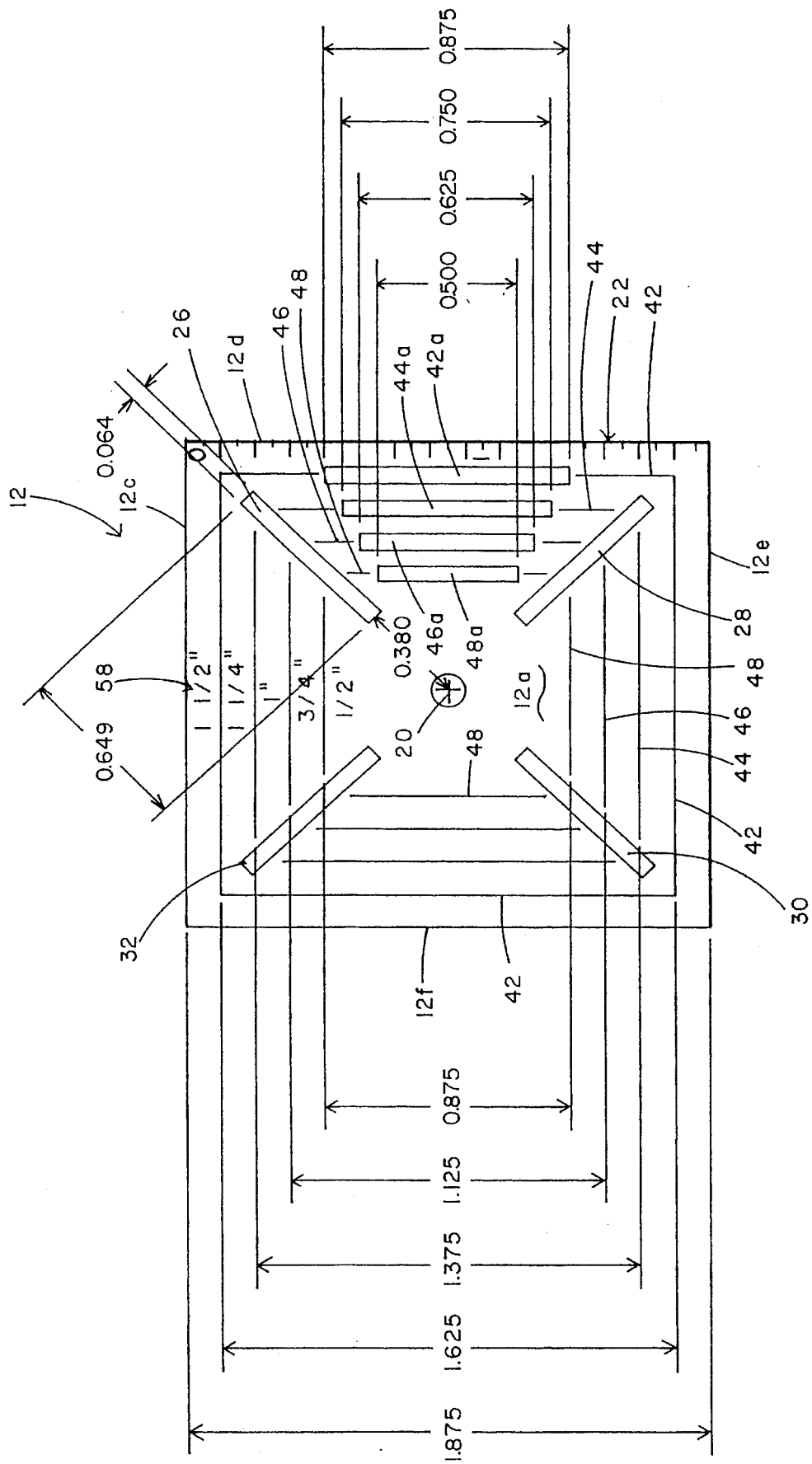
FIG. 5 is a schematic view of the inner portion of the template of FIG. 1, enlarged for clarity and showing the actual dimensions, in thousandths of an inch, of the corresponding template elements, and the trade sizes (i.d.), in inches, of the pipes to be installed in the holes which can be made using the new template.
Figure 6:
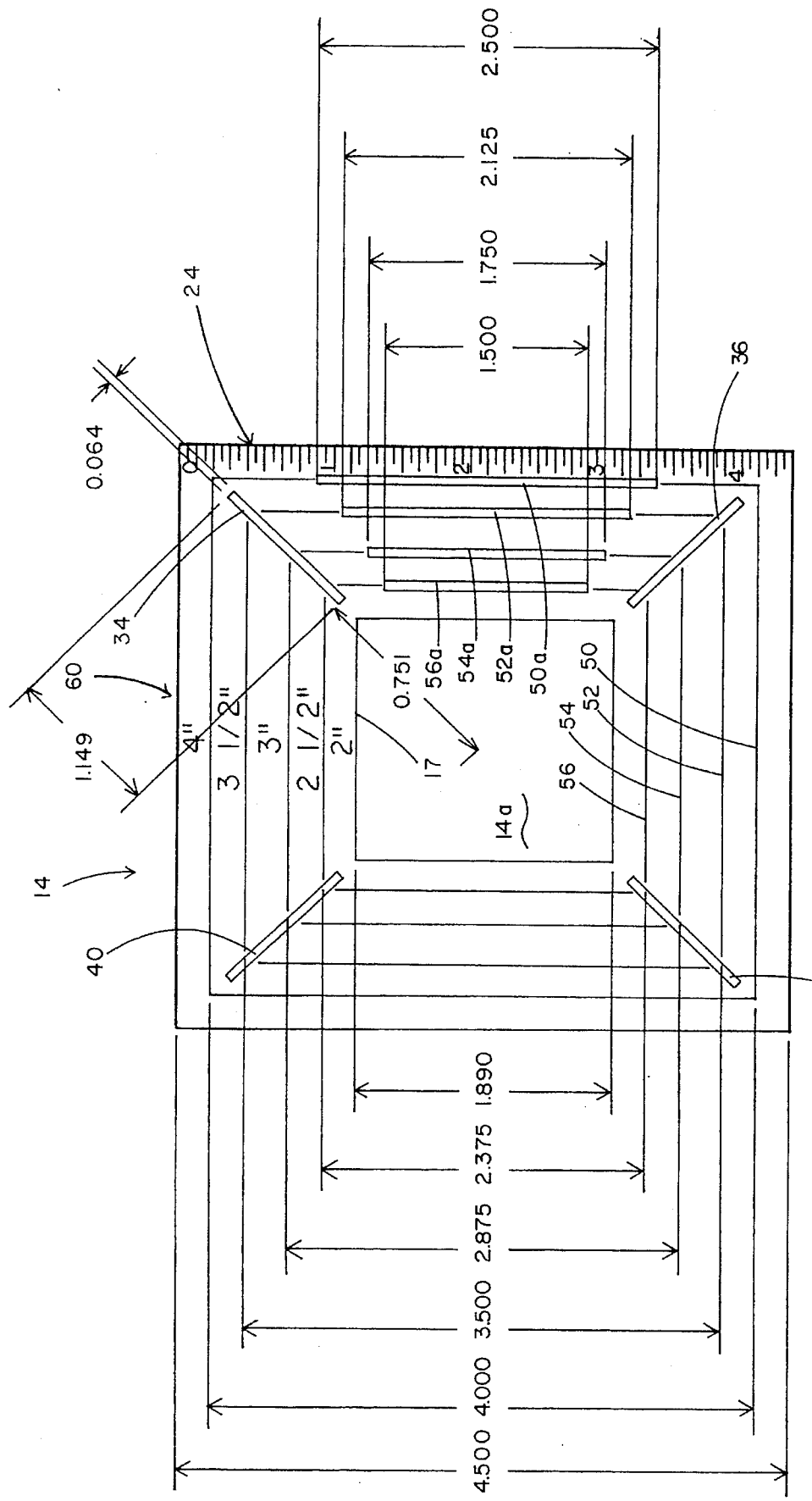
FIG. 6 is a schematic view of the outer portion of the template of FIG. 1, enlarged for clarity and marked in the manner of FIG. 5. showing the actual dimensions, in thousands of an inch, of the inner diameter of a pipe for which an hole is made using particular markings on the template.

Thus, as seen in FIG. 5, lines 42, 44, 46, 48 which form coaxial squares are molded, marked or otherwise formed on flat surface 12a of template portion 12, inwardly from the outermost edges thereof and are spaced apart from parallel adjacent lines by 0.250 in. Inwardly from at least one template side edge, and preferably from edge 12d (on the right side of the figure), these lines are each interrupted by a longitudinal slot 42a, 44a, 46a, 48a, respectively. Alternatively, these lines and slots could take a different, although less desirable shape. For example, the lines could form concentric circles and the slots thereon for marking a hole edge could be curved.

Similarly, as shown in FIG. 6, portion 14 has coaxial squares marked by lines 50, 52, 54, 56, spaced apart from each adjacent square and interrupted parallel to and inwardly of side edge 14d by straight, longitudinal slots 50a, 52a, 54a, 56a, respectively, for marking the diameter of larger conduit holes. In each case, the trade size of the conduit for which the hole is to be marked corresponds to an appropriate one of the indicia 58, 60 marked on the template 10 portion. For example, if a conduit having a trade size of 2 and one half in. is to be installed, the exterior hole diameter is marked via slot 54a in template 14.

In each case, the parallel slots 42a, 44a, 46a, 48a and 50a, 52a, 54a, 56a are formed in the corresponding lines 42, 44, 46, 48 and 50, 52, 54, 56, respectively, to the user's right, for most convenient use by a right-handed user. However, the slots can be formed and spaced inwardly from any one or more of the template portion edges. For example, a left-handed user might prefer that the parallel slots be formed in the lines positioned at his left, or in the line section directly opposite the indicia 58, 60. Any of these arrangements will function adequately, but that shown in the figures is preferred.

The perimeter or edge 17 of opening 18 is spaced inwardly of slot 56a (by 0.455 in.) and the area of inner portion 12 is sized and shaped accordingly to be coaxially received within opening 18, as previously described. The outermost edge of portion 14 is spaced appropriately from the center opening 20 of inner portion 12, when the two portions are operably positioned together as shown in FIG. 2, for marking the outer edge of an entry hole having an outer diameter of 4.5 in. for conduit with a trade size of 4.0 in.

FIGS. 5 and 6 are schematic illustrations of template portions 12, 14, respectively, and show the preferred, precise dimensions to which the elements of the templates are formed for optimal ease of use with the imperial numbering system, for forming entry holes for installation of the most commonly used trade sizes of electrical conduit. Of course, these figures can be extrapolated or converted as necessary if template 10 is to be used with the metric numbering system or for other than the usual conduit sizes shown.

Thus, as shown in FIG. 5, when constructed as preferred, portion 12 has elements spaced and sized as follows:

The center of central hole 20 is 0.380 in. from the inner most end of each angled slot 26, 28, 30, 32. Each of the slots is 0.649 in long and 0.064 wide. The side lengths of marked squares 42, 44, 46, 48 are 1.625, 1.375, 1.125, and 0.875 in., respectively, and the length of each side edge 12c, 12d, 12e, 12f of square inner template portion 12 is 1.875 in.

The width of each slot 42a, 44a, 46a, 48a is also about 0.064 in. and their respective preferred lengths are 0.875, 0.750, 0.625, and 0.500 in. As will be seen in the discussion of use which follows, these dimensions can vary somewhat and the slots will be still be useful.

As noted by the indicia indicated generally at arrow 58 in FIG. 5, to form a conduit entry hole for a pipe having a trade size (i.d.) of one-half in. the outer edge of the hole is marked using slot 48a, slot 46a corresponds to the outer diameter of a pipe or conduit hole having a trade size of three quarters in., slot 44a is for trade size one in., slot 42a is for trade size one and one fourths in., and outer edge 12d is used to mark the exterior diameter of a conduit having a trade size of one and one half in.

FIG. 6 is a schematic representation showing the preferred dimensions of the various elements of template portion 14 as given below:

The center of central hole 18 is 0.751 in. from the inner most end of each angled slot 34, 36, 38, 40. Each of the slots is 0.1.149 in long and 0.064 wide. The side lengths of marked squares 50, 52, 54, 56 are 4.000, 3.500, 2.875, and 2.375 in., respectively, and the length of each side edge 14c, 14d, 14e, 14f of square outer template portion 14 is 4.500 in. The inside edge 17 of opening 18 has four sides, each 1.890 in. long. If a shoulder 16 is provided it extends inwardly from edge 17 almost imperceptibly; only enough to keep inner portion 12 from inadvertently passing entirely through opening 18.

The width of each slot 50a, 52a, 54a, 56a is also about 0.064 in. and their respective preferred lengths are 2.500, 2.125, 1.750, and 1.500 in. As will be seen in the discussion of use which follows, these dimensions can vary somewhat and the slots will be still be useful.

As noted by the indicia indicated generally at arrow 60, to form a conduit entry hole for a pipe having a trade size (i.d.) of two in. the outer edge of the hole, sized to match the outer diameter of the pipe to be inserted, is marked using slot 56a, slot 54a corresponds to the outer diameter of a pipe or conduit hole having a trade size of two and one-half in., slot 52a is for trade size three in., slot 50a is for trade size three and one-half in., and outer edge 14d is used to mark the exterior diameter of a conduit having a trade size of four in. as mentioned above. Central opening 18 of outer portion 14 is sized and shaped to assist with coaxial placement of portion 12 inside of outer portion 14. The outer edge 12d of inner portion 12 is used when portion 12 is used without outer portion 14, to mark conduit entry holes for pipes having a trade size of one and one-half inches.

An example of use of new conduit entry hole template 10 is provided hereafter with reference to FIGS. 7A, 7B, 7C, 7D and 8.

Although a plurality of conduit openings could be drilled at random positions in the electrical box panel, a craftsman necessarily prefers to form the openings in some logical and neat arrangement for reasons of both aesthetics and functionality. Thus, the new template 10 has been designed to make it as efficient and facile as possible to accomplish this goal when the device is used as described hereafter.

Figure 7A:
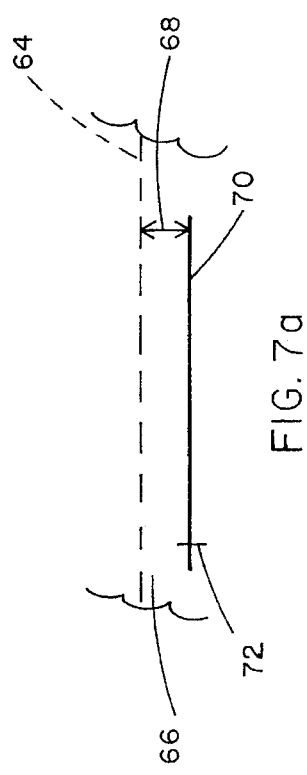
FIG. 7A is a schematic illustration of the initial starting line made for use with the template of FIG. 1.

Phantom line 64 in FIG. 7A represents the intersection of a wall and a top panel 66 of a conventional electrical box mounted thereon. Using the handy ruler 22 provided on one edge of template portion 12, line 70 is marked on panel 66 at a preselected distance, indicated by arrow 68, which is the distance at which the circular edge of all conduit openings in a row of such holes to be made will be positioned. That is, for neatness and order, all conduit entry holes formed in relation to line 70 will have a point on their circumferences on the same side line 70. The line will not pass through the holes; i.e., the holes, regardless of their diameters, will be aligned along their edges, not along their centers or any other points inside the circumferences thereof. The holes may be considered to be placed on the "front" of the line, or if on the other side, on the "back" of the line. Either placement may be appropriate, depending on the particular job.

After line 70 is marked, preferably equidistant at all points thereon from wall intersection 64, a short mark 72 is made transversely near the one end (for example, the left end, as shown, especially when the user if right-handed) of line 70, to indicate the external end position of the circumference of the first conduit entry hole to be formed, working in this example from the new template user's left to the user's right, facing the line 70 as it is shown in FIG. 7A.

Figure 7B:
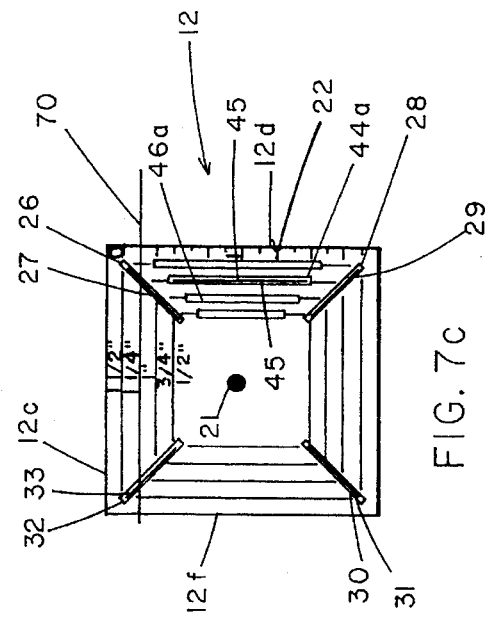
FIG. 7B is a schematic illustration of the template of FIG. 1 positioned over the line of FIG. 7A for marking a conduit entry hole having a trade size of one inch.

FIG. 7B shows the position of template portion 12 in relation to line 70 and transverse mark 72 when it is desired to mark the site for cutting an entry hole for an electrical wire conduit having a trade size of one inch. The portion of line 44 which is disposed outwardly of and adjacent to the indicia 58 for trade size 1 in., inwardly of edge 12c is positioned parallel to and directly over line 70. Template portion 12 is then adjusted, substantially horizontally, left and right until the intersection of line 70 and mark 72 is seen within angled slot 32, at the upper left of the template in the figure. At this point, the left "leg" of the square (the line 44 on the user's left) is in alignment with the transverse mark 72, shown positioned vertically in FIG. 7B. Thus, the alignment of the template for marking the left edge of the hole can be accomplished whether template 10 is clear or opaque.

Figure 7C:
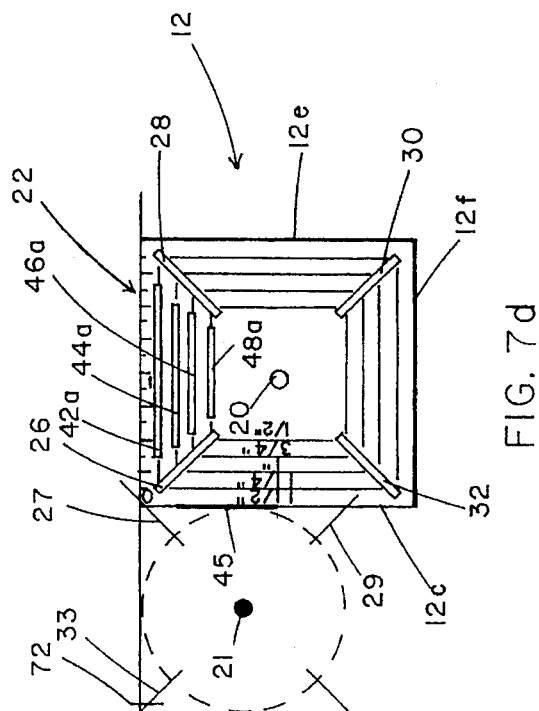
FIG. 7C is a schematic illustration of the template of FIG. 7B and with center, side and cross hair indications marked.

As shown in FIG. 7C, a pencil mark 21 is made through center hole 20 to mark the center of the first conduit entry hole H to be formed.

A mark 45 is made through slot 44a, which as seen in FIG. 7C is disposed vertically at the user's right, indicating the right-most edge of hole H. Marks 27, 29, 31, 33 are made through angled slots 26, 28, 30 and 32, respectively, as seen in FIG. 7C.

With these few steps the conduit entry hole H (shown in phantom in FIG. 7D) for a first conduit having an inner diameter of one inch has been completely marked. It is to be understood that the exact order of the above marking steps may vary slightly, depending upon the preference of the user, and still result in all the necessary marks for a conduit entry hole being made accurately.

Figure 7D:
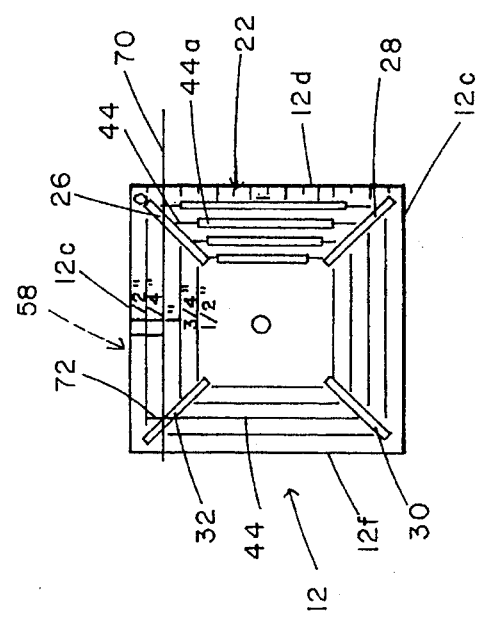
FIG. 7D is a schematic illustration of the template of FIG. 7C rotated counter-clockwise 90° and moved to the right on the line of FIG. 7A, for marking the next intended conduit hole, and showing the markings left for forming the first hole marked as shown in FIG. 7C.

It should be noted that a left-handed user may prefer to start at the right end of 70 and add successive holes by moving to his left. The desired conduit hole can be drilled out immediately or, if other entry holes are also to be made in the same panel, it is usually preferred to mark them all before drilling any of the holes. In that case, the user moves template portion 12 to the position shown in FIG. 7D by simply rotating it in the plane in which it lies, flush on the surface of panel 66. In this case, with ruler 22 provided on edge 12d, turning template portion 12 90° counter-clockwise permits ruler 22 to be positioned horizontally (longitudinally) along line 70 so that template edge 12c, as shown in FIG. 7D, now lies parallel and above mark 45 which was just made through slot 44a.

In this manner, using ruler 22, the position of the left-most edge of the next hole to be formed can be marked along line 70, wherever desired, for example such as at transverse mark 74 shown in FIG. 8. By using ruler 22 in this manner it is a simple matter to ensure that the closest points of the edges of all adjacent pipe holes are equidistant, regardless of the various sizes of conduit to be installed.

Then, the process just described is repeated, marking at opening 20 the center of the second hole to be formed and marking the extreme right edge of that conduit entry hole through one of the parallel slots, 42a, 44a, 46a, 48a, as desired, depending on the size of the next conduit to be installed along line 70. Thus, if the next pipe in the row has a trade size of three fourths of an inch, the extent of the hole edge is marked via slot 46a, and the cross hair markings are again marked through angled slots 26, 28, 30, and 32 before turning and moving template portion 12 again along line 70 to the user's right to mark the next hole left edge indicator at line 76.

It should be understood that although it is possible to mark conduit entry holes with template 10, without making the cross hair marks, it is significantly easier and more accurate to subsequently cut the holes with such cross hairs in place. Use of a conventional knockout cutter without cross hair marks for the hole will more than likely lead to more holes being cut off-center than if the marks are provided.

FIG. 8 schematically illustrates, as only one example, the markings that would appear along line 70 if such line were marked for drilling holes therealong in the manner just described, for receipt of conduit having, from left to right, trade sizes of one half, three quarters and one inch. Taking into account the standard wall thicknesses for these conduits, the diameters of the conduit holes formed must then be seven eighths, one and one eighth, and one and three eighths inches, respectively.

However, as seen in FIG. 8, although the conduit entry holes to be formed become progressively larger, from left to right, a point along the edge of the "back" of each hole will touch line 70 and the closest distance between the edges of any two adjacent holes are equal. (If the holes were selectively formed on the opposite side of line 70 it would be said the that the line is tangential to the "fronts" of the conduit entry holes.)

If entry holes larger in the diameter than one and one-half in. are desired to be formed, then the same procedure is followed, with only the additional requirement of placing template portion 14 coaxially over portion 12 and marking the desired hole size(s) accordingly via slots 50a, 52a, 54a, 56a and marking the cross hairs via angled slots 34, 36, 38, 40 in portion 14.

A hole center is still indicated for such larger holes by making a mark through opening 20 in inner portion 12, because, properly positioned, opening 20 is still in the center of the template when portions 12 and 14 are used together as a unit. Once the center is marked, such as at 21, the inner portion 12 can be removed and outer portion 14 can then be used alone. For example, after the center is marked and portion 12 is removed, the edge of a hole for 3 in. trade size conduit can be marked by using slot 52a in portion 14. Thus, the new template 10 permits rapid and neat hole marking for any number of conduits and a variety of sizes thereof.

FIG. 9 schematically illustrates the markings that result along a line such as that indicated at 70' if the above-described three holes were formed in the same order, but by the conventional marking method, using a square and ruler. Although the marks shown in FIG. 9 may be equally useful for forming the desired conduit holes, as compared to those marks resulting from the new method, the time required by the method of FIG. 9 is many times longer, and the previously known procedure is certainly more tedious and prone to error because of the many steps and calculations involved.

For example, in order to adapt an electrical wiring box for three pipes having trade sizes of one half, three quarters and one inch, it is necessary to form entry holes having diameters of seven eighths, one and one eighth and one and three eighths, respectively. To accomplish this task by the conventional method, the following procedure is necessary:

A panel, not shown, is marked with a reference line, such as 70' in FIG. 9. A transverse (perpendicular in the figure) reference mark 72' is made to indicate the extent to which the leftmost edge of the first hole will be placed and the width of the first hole is indicated to the right on line 70', at mark 72".

One half the diameter of the first hole is calculated as being seven sixteenths of an inch and another perpendicular line 73' is made across line 70', extending downwardly therefrom, between left edge mark 72' and right edge mark 72". Line 73' will pass through the center of the first hole to be formed. As the hole to be formed is intended to have a diameter of seven eighths of an inch, the radius is calculated and a horizontal line 75' is marked, perpendicular to line 73', parallel and beneath line 70'.

If a uniform space is desired between all pipes, regardless of diameter, this distance must be marked along line 70' before marking the size of the next conduit. In FIG. 9 the distance between the first two pipe holes is marked on line 70' by mark 74', measured from mark 72".

Continuing with the known method, if the second pipe to be installed has a trade size of three quarters in. and thus requires an actual hole size of one and one eighths in., that distance must be marked and also half of that distance must be calculated and marked on line 70' at vertical perpendicular line 77' and then a horizontal line (which of course requires measuring from at least two points on line 70' downwardly) 79' is made perpendicularly across line 77' beneath line 70'. The radius of the second hole is also marked to the right of line 77' on line 70' to indicate the extreme right boundary of the second hole.

The above procedures are repeated, recalculating and marking as necessary for the third hole, taking into account the increased size thereof. Thus, upon completion of marking by the conventional method the marks on the conduit panel will appear substantially as shown in FIG. 9. As with the new method, the holes are actually cut by drilling a pilot hole at the intersection of the cross hairs and then cutting the actual conduit hole by alignment of a knockout cutter with the cross hairs themselves.

It is to be understood that more than one row of conduit entry holes may be required for a given job and thus a great deal of calculating and measuring is necessary to perform this task by the conventional method. By contrast, with the new method, using template 10 or only portion 12 thereof these calculations and measurements are greatly reduced because they are effectively incorporated into the template itself.

Thus, with the new template the user need merely position the template and mark the first hole, move it and mark the next hole, move it again and mark the third hole, and so on. The only information needed to accurately mark entry holes with the new template is the trade size of the conduit to be installed, the distances from the edges of the panel in which the holes will be placed and the distance the be allowed between adjacent entry holes. Calculations of distances and fractions of fractions are avoided because they have already been incorporated into the template itself.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A template for facilitating marking of entry holes in a surface for passage therethrough of conduit, the template comprising:

at least one flat portion formed of semi-rigid material and having a first side and a second side opposed to the first side, the first side and the second side being limited in their extent by a perimeter, the at least one flat portion having a central opening formed therethrough from the first side to the second side, the at least one flat portion further having a plurality of markings on the first side, the plurality of markings being parallel to at least a section of the perimeter and spaced inwardly at graduated distances therefrom, the plurality of markings corresponding to outside diameter sizes of conduit, and a plurality of slots formed through the at least one flat portion from the first side to the second side, spaced apart and parallel to one another, substantially coextensively with each corresponding one of the plurality of markings spaced inwardly from at least a section of the perimeter of the at least one flat portion, to thereby permit a user of the template to make a mark through one of the slots to indicate an outer edge of a hole of a preselected size to be formed using the template, and further comprising indicia on the first side thereof in positions closely associated with and corresponding to each of the plurality of markings to thereby indicate the internal diameter of a conduit for which a hole being marked with the template is to be formed.

2. The template of claim 1, wherein the first flat portion is square, having a perimeter with a first edge, a second edge, a third edge and a fourth edge all of equal length, and further wherein the markings of the plurality of markings parallel to a section of the perimeter are elongated markings parallel to each other and inwardly of at least one of the first edge, the second edge, the third edge and the fourth edge, and still further wherein the plurality of slots are elongated, straight slots formed along at least some of corresponding ones of the plurality of elongated markings parallel to one of the first edge, the second edge, the third edge and the fourth edge of the at least one flat square portion.

3. The template of claim 2, and further comprising first, second, third and fourth straight slots which extend at angles substantially from the corners of the template toward the center of the template and radiate outwardly therefrom, the first, second, third and fourth straight slots each passing entirely through the at least one flat, square portion from the first side to the second side and extending at 45° from first, second, third and fourth corresponding points spaced outwardly from and around the central opening, along imaginary lines from the center of the template to each of four corresponding corners formed by intersections of the first, second third and fourth edges of the at least one flat square portion, to thereby permit the user of the template to mark cross hairs by which to accurately align a tool for forming a conduit entry hole.

4. The template of claim 1, wherein the central opening in the at least one flat portion is sized appropriately to permit passage therethrough of a marking device, to thereby mark the center of a hole to be marked with the template.

5. The template of claim 2, and further comprising a ruler contiguous with the entire length of at least one of the first edge, the second edge, the third edge and the fourth edge of the at least one flat, square portion, to thereby facilitate correct placement of markings which indicate the distance between holes to be marked using the template, as well as to mark a preselected distance from a surface edge for the holes to be formed thereon.

6. The template of claim 2, wherein the at least one flat, square portion comprises a first flat square portion and a second flat square portion, the first flat, square portion being smaller than the second flat, square portion and the second flat, square portion having a central, square opening therein, the opening in the second flat portion being sized for receipt of the first flat portion, and the opening in the first flat square portion being a hole sized appropriately to permit passage therethrough of a marking device, to thereby mark the center of a hole to be marked on a surface using the first flat square portion and the second flat, square portion of the template together for marking a hole having a diameter larger than can be marked with only the first flat square portion of the template alone.

7. The template of claim 6, wherein the second flat, square portion includes a shoulder formed around the perimeter of the central, square opening to prevent the first flat square portion from passing entirely through the opening in the second flat, square portion when the first flat, square portion and the second flat, square portion are used together to mark a conduit entry hole.

8. The template of claim 1, wherein the indicia are molded as part of the template and are raised from the first surface thereof.

9. The template of claim 1, wherein the indicia are marked on the template so as to be flush with the first surface thereof.

10. The template of claim 6, wherein each of the first flat, square portion and the second flat, square portion further comprise first, second, third and fourth slots which extend at angles substantially from the corners of the corresponding first and second flat square portions toward the centers thereof, each of the first, second, third and fourth straight slots of each of the first and second flat square portions passing entirely through the corresponding flat, square portion from the first side to the second side and extending at 45° from first, second, third and fourth corresponding points spaced outwardly from and around the central opening, along imaginary lines from the center of the template to each of four corresponding corners formed by intersections of the first, second third and fourth edges of the corresponding flat square portion, to thereby permit the user of the template to mark cross hairs by which to accurately align a tool for forming a conduit entry hole.

11. The template of claim 6, and further comprising a ruler contiguous with the entire length of at least one of the first edge, the second edge, the third edge and the fourth edge of the first flat, square portion and a ruler contiguous with at least one of the first edge, the second edge, the third edge and the fourth edge of the second flat, square portion, to thereby facilitate correct placement of markings which indicate the distance between holes to be marked using the template, as well as to mark a preselected distance from a surface edge for the holes to be formed thereon.

12. The template of claim 1, wherein the template is formed of plastic.

13. The template of claim 1, wherein the template is formed of resin.

14. The template of claim 1, wherein the template is formed of injection molded plastic.

15. The template of claim 2, wherein each of the first, second, third and fourth edges of the at least one flat square portion is 1.875 inches long and the plurality of elongated, straight slots comprise four parallel slots spaced apart at distances appropriate for marking the edges of holes to be formed in a surface for conduit having an interior diameter of one-half, three quarters, one, and one and one quarter inches and the first, second, third and fourth edges of the at least one flat portion can be used for marking a hole for entry of a conduit having a diameter of one and one-half inches.

16. The template of claim 6, wherein each edge of the first flat square portion is 1.875 inches long and the plurality of elongated, straight slots comprise four parallel slots spaced apart at distances appropriate for marking the edges of holes to be formed in a surface for conduit having an interior diameter of one-half, three quarters, one, and one and one quarter inches and the outside edge of the first flat, square portion can be used for marking a hole for conduit having an interior diameter of one and one-half inches, and further wherein each edge of the second flat square portion is four and one-half inches long and the plurality of elongated, straight slots in the second flat square portion comprise four parallel slots spaced apart at distances appropriate for marking the edges of holes to be formed in a surface for conduit having an interior diameter of two, two and one-half, three, and three and one-half inches, and each of the first, second, third and fourth outside edges of the second flat square portion can be used to mark an entry hole for conduit having an interior diameter of four inches.

17. The template of claim 5, wherein the ruler is formed on only one of the first edge, the second edge, the third edge and the fourth edge of the first flat, square portion and each one of the plurality of elongated slots are spaced inwardly from and are parallel to the same one of the first edge, the second edge the third edge and the fourth edge of the first square, flat portion of the template upon which the ruler is formed.

18. A method for marking entry holes to be formed in a surface for passage through the holes of conduit, the method comprising the steps of:

(a) applying a template having at least one flat portion to the surface to be marked, the template having at least one flat portion formed of semi-rigid material and having a first side and a second side opposed to the first side, the first side and the second side being limited in their extent by a perimeter, the at least one flat portion having a central opening formed therethrough from the first side to the second side, the at least one flat portion further having a plurality of markings on the first side, the plurality of markings being parallel to a section of the perimeter of the at least one flat portion and spaced inwardly at graduated distances therefrom, and a plurality of slots formed through the at least one flat, portion from the first side to the second side, spaced apart and parallel to one another, substantially coextensively with corresponding ones of the plurality of markings spaced inwardly from a section of the perimeter of the at least one flat portion, the first side still further having indicia in positions closely associated with and corresponding to each of the plurality of markings to thereby indicate the internal diameter of a conduit for which a hole being marked with the template is to be formed, (b) marking a line on the surface to be marked at a preselected distance from an edge of the surface to be marked, (c) making a transverse mark at one end of the line to thereby indicate the outermost edge of a hole to be formed in the surface, and placing at least a portion of the perimeter of the template against the line marked, using the transverse mark as an alignment point, and (d) selecting one of the plurality of slots by determining which of the corresponding indicia matches the internal diameter of the conduit to be passed through the hole to be formed, (e) marking the edge of the hole to be formed by making a mark through the preselected one of the plurality of slots formed through the at least one flat portion of the template, to thereby mark the circumference of the entry hole to be formed, without the necessity of performing any mathematical calculations.

19. The method of claim 18, wherein the template used has four straight slots extending radially outwardly and spacedly from the central opening of the template, each slot being at 90° for each adjacent slot, and extending outwardly toward the perimeter of the flat portion, and further comprising making a mark on the surface through each one of the four straight slots extending radially outwardly.

20. The method of claim 19, and further comprising marking the center of the hole to be formed through the central opening of the at least one flat portion of the template.

* * * * *